United States Patent [19]
Moriue et al.

[11] Patent Number: 5,940,366
[45] Date of Patent: Aug. 17, 1999

[54] MULTIPLEX TRANSMISSION METHOD

[75] Inventors: Hiroo Moriue; Eiji Ichii, both of Hiratsuka, Japan

[73] Assignee: The Furukawa Electric Co., Ltd., Tokyo, Japan

[21] Appl. No.: 08/785,977

[22] Filed: Jan. 21, 1997

[51] Int. Cl.⁶ .................................................. H04J 3/02
[52] U.S. Cl. .................................... 370/216; 370/450
[58] Field of Search ................................ 370/216, 535, 370/537, 225, 227, 451, 450, 449, 447, 442, 444, 445, 452, 454, 455, 456, 458, 461, 462, 503, 506, 509, 510; 395/181; 340/827, 825.01, 825.5, 825.51, 825.03, 825.08

[56] References Cited

U.S. PATENT DOCUMENTS 5,515,418  5/1996  Yamaguchi et al. ................ 370/216
5,796,717  8/1998  Shinbashi et al. .................. 370/216

*Primary Examiner*—Dang Ton
*Attorney, Agent, or Firm*—Frishauf, Holtz, Goodman, Langer & Chick, P.C.

[57] ABSTRACT

Basic nodes each having a communication control circuit and a CPU and I/O nodes each having a communication control circuit are interconnected via a bus. Each of the communication control circuits makes the bus active when transmitting a frame therefrom, and on judging that the bus is not active when receiving the frame, suspends the frame transmission and enters a transmission inhibited state. The basic nodes periodically transmit a frame, and when this frame is received, each I/O node cancels its transmission inhibited state and thus is restored to the state in which the frame transmission therefrom can be initiated.

34 Claims, 7 Drawing Sheets

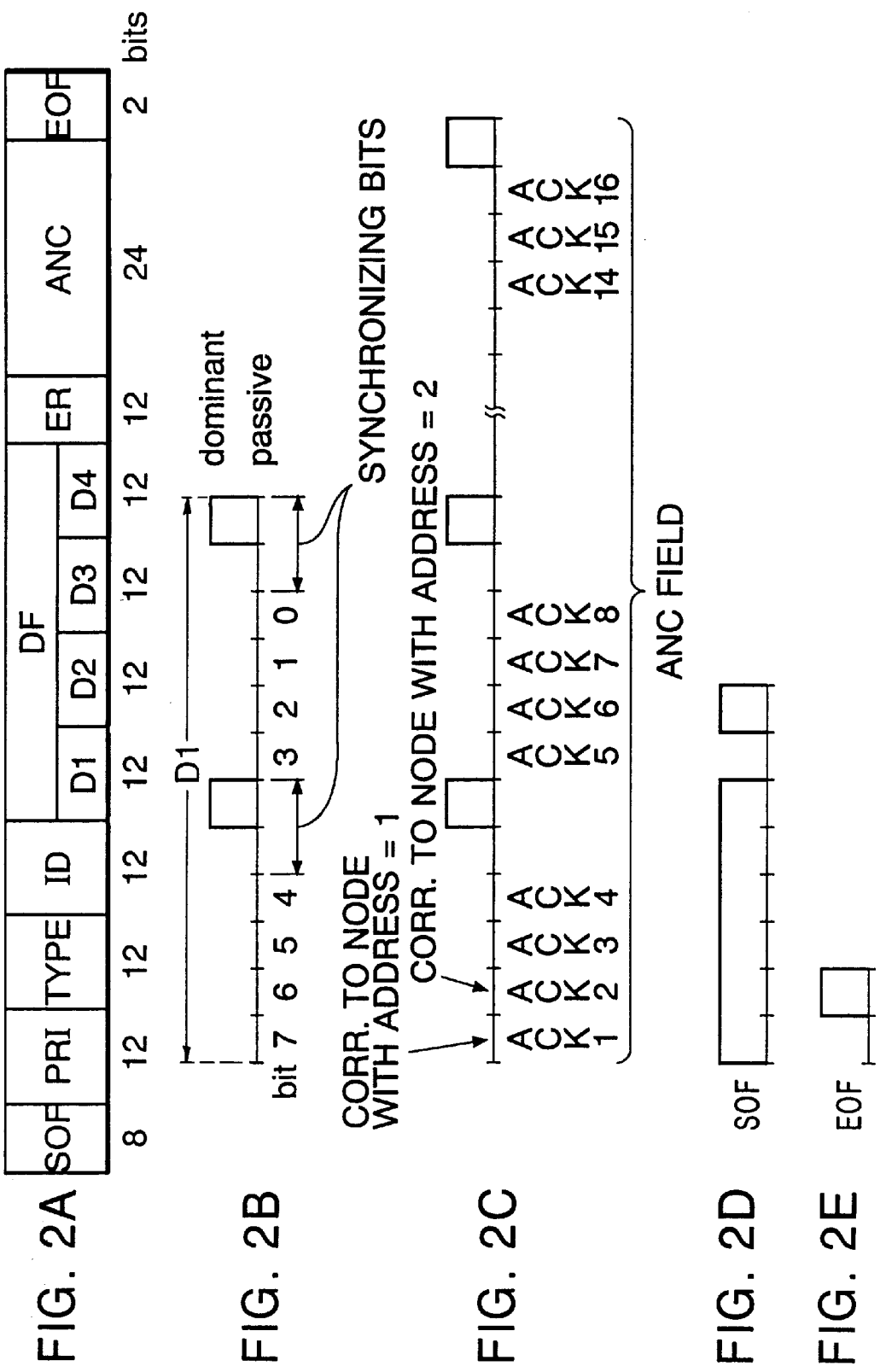

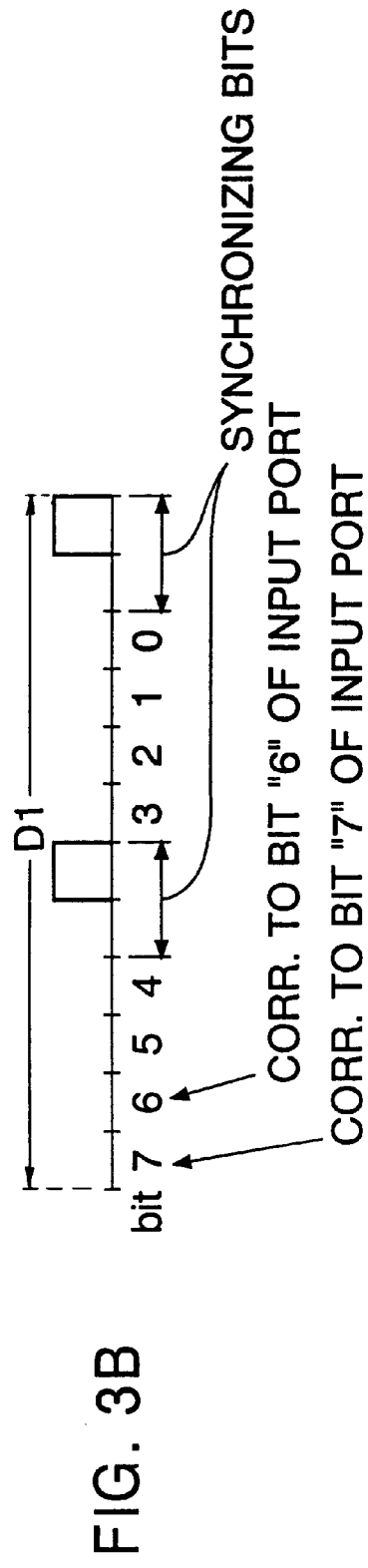
FIG. 3A
FIG. 3B
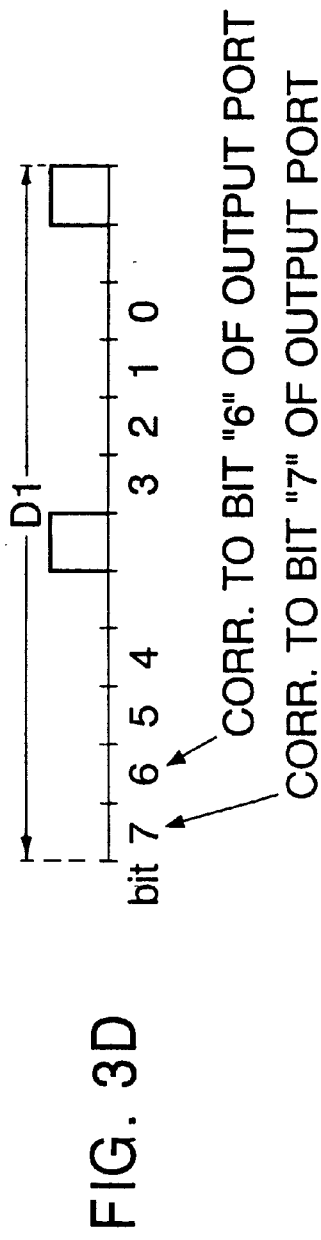
FIG. 3C
FIG. 3D

MULTIPLEX TRANSMISSION METHOD

BACKGROUND OF THE INVENTION

1. Field of the Invention

This invention relates to a multiplex transmission method for multiplex transmission apparatuses interconnected via a multiplex transmission line for transmitting and receiving messages, and more particularly, to a multiplex transmission method for restoring multiplex transmission apparatuses which have been set in a transmission inhibited state due to a fault.

2. Description of the Related Art

Conventional multiplex transmission methods are used in systems such as a LAN in which a plurality of multiplex transmission apparatuses (hereinafter referred to as "nodes") are interconnected via a multiplex transmission line (hereinafter referred to as "bus") constituted by a paired wire or the like.

A basic node 10 is provided as shown in FIG. 6, for example. The basic node 10 includes a communication control circuit 11 comprising a communication IC connected to a bus MB, a control circuit (hereinafter referred to as "CPU") 12 for controlling the operation of the communication control circuit 11 and the input/output of data, an input/output interface circuit (hereinafter referred to as "input/output I/F circuit") 13, and a power supply circuit 14. A switch S, a motor M and other loads L, for example, are connected to the CPU 12 of the basic node 10 via the input/output I/F circuit 13.

In addition an I/O node 20 is provided as shown in FIG. 7, for example. The I/O node includes a communication control circuit 21 comprising a communication IC connected to the bus MB, and a power supply circuit 24. The communication control circuit 21 of the I/O node 20 is connected to two switches S, a lamp R and a motor M, for example, via its input and output ports 22 and 23, and this I/O node 20 exclusively takes care of the input/output of data.

In the basic node 10, the communication control circuit 11 includes a control register (not shown) therein. In a situation where a fault has occurred in the bus MB (e.g., in a branch or bus I/F of the bus), if a transmission request flag of the control register is set by the CPU 12, the communication control circuit 11 starts to transmit a frame, but upon detecting the abnormality, it sets a transmission inhibit flag in the control register and enters a transmission inhibited state.

After detecting the setting of the transmission inhibit flag, the CPU 12 clears the transmission inhibit flag upon lapse of a predetermined time period, whereby the basic node recovers from the transmission inhibited state. Upon recovery from the transmission inhibited state, the communication control circuit 11 again starts to transmit the frame. If the fault still exists, the communication control circuit 11 repeats the aforementioned transmission inhibiting operation; on the other hand, if the fault has been mended, the communication control circuit 11 transmits the frame to the end.

The communication control circuit 21 of the I/O node 20 also includes a control register (not shown) therein. In a situation where a fault has occurred in the bus MB, if a transmission request flag is set because of a change of a value in the input port 22, the communication control circuit 21 starts to transmit a frame, but upon detecting the abnormality, it sets a transmission inhibit flag in the control register and enters the transmission inhibited state.

According to the conventional multiplex transmission method, once the I/O node 20 enters the transmission inhibited state, it cannot recover from the transmission inhibited state unless it is reset, posing a problem that the I/O node cannot be immediately restored to the network after the bus fault is mended.

SUMMARY OF THE INVENTION

This invention was created in view of the above circumstances, and an object thereof is to provide a multiplex transmission method capable of restoring a multiplex transmission apparatus, which has been set in a transmission inhibited state due to a fault in a multiplex transmission line, to an active state immediately after the fault is mended.

The above object is achieved by a multiplex transmission method according to this invention. According to the multiplex transmission method of this invention, nodes transmit and receive messages having a frame format. The nodes include basic nodes and I/O nodes connected to a bus trunk via respective branches, the basic nodes each having a communication control circuit and a CPU for controlling the operation of the communication control circuit, while the I/O nodes each having a communication control circuit. Each of the communication control circuits makes the bus active when transmitting a frame therefrom, and on judging that the bus is not active when receiving the frame, suspends the transmission of the frame and sets the operation mode thereof in a transmission inhibited state. The basic nodes periodically transmit a frame therefrom, and each I/O node cancels its transmission inhibited state in response to the received frame and thus is restored to a state in which the frame transmission therefrom can be started.

In the case where a plurality of I/O nodes interconnected via a bus and each having a communication control circuit transmits and receives messages having a frame format, for example, each I/O node includes a timer, so that it starts the timer upon entry to the transmission inhibited state and periodically cancels the transmission inhibited state. Preferably, each I/O node tries the frame transmission and determines whether the bus is active or not based on the received frame, and if it is judged that the bus is active, the I/O node is restored to a state in which a frame can be transmitted therefrom.

Each of the nodes preferably transmits and receives a frame in which an identifier previously assigned thereto is inserted, compares the identifier inserted in a frame with the identifier previously assigned thereto when the frame is received, and processes the received frame if the identifier inserted in the received frame differs from the identifier of the frame transmitted therefrom, to thereby cancel the transmission inhibited state.

BRIEF DESCRIPTION OF THE DRAWINGS

FIGS. 2A to 2E are diagrams illustrating the frame format of a message used in the system of FIG. 1;

FIGS. 3A to 3D are diagrams illustrating the format of a frame which an I/O node shown in FIG. 1 receives and transmits;

DETAILED DESCRIPTION OF THE PREFERRED EMBODIMENTS

A multiplex transmission method according to this invention will be now described with reference to FIGS. 1 through 5.

Figure 1:
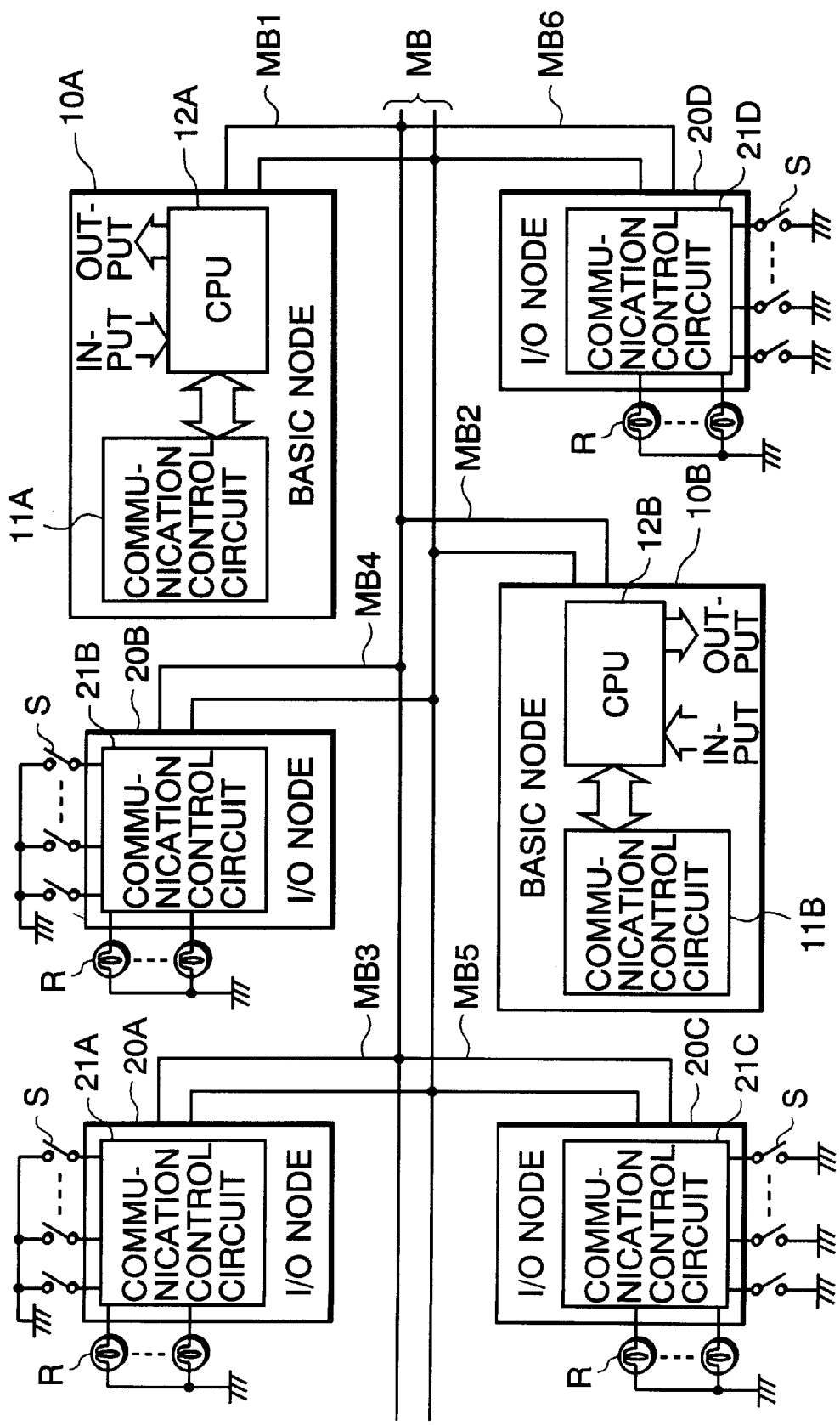
FIG. 1 is a diagram showing the configuration of a multiplex transmission system to which a multiplex transmission method according to this invention is applied.
Figure 4:
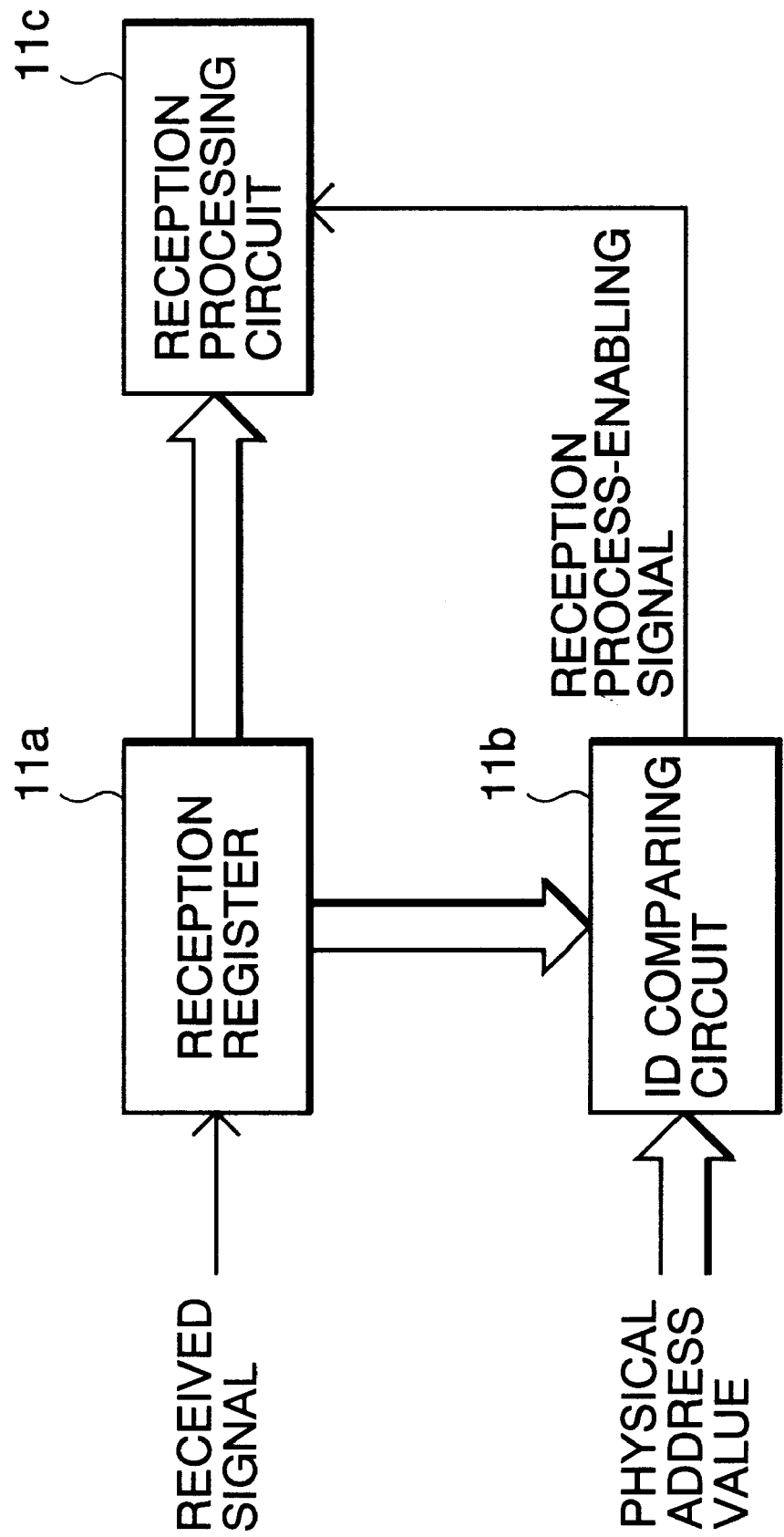
FIG. 4 is a block diagram showing, by way of example, the arrangement of a communication control circuit of the I/O node.

FIG. 1 illustrates the configuration of a multiplex transmission system (network) to which the multiplex transmission method according to this invention is applied. Referring to FIG. 1, basic nodes 10A and 10B and I/O nodes 20A to 20D are connected to a bus trunk (hereinafter referred to as "bus") MB via respective bus branches (hereinafter merely referred to as "branches") MB1 to MB6 each comprising a paired wire or the like. These nodes can exchange messages having a frame format with one another through the bus MB.

As shown in FIG. 2A, the frame of a message is made up of a Start-Of-Frame (SOF) indicating the start of the message, a Message Priority (PRI) indicating the degree of priority of the message, an identification code (TYPE) indicating the type of this frame, an Identifier (ID) indicating the contents (function) of data, a Data Field (DF) consisting of 4-byte data, an error checking code (ER), an Acknowledgment-for-Network-Control (ANC) Field, and an End-Of-Frame (EOF) indicating the end of the message.

The PRI through the ANC Field include synchronizing signals with the same data format and are transmitted by means of these signals. As a typical example, the synchronizing signals of the Identifier (ID) are illustrated in FIG. 2B. As illustrated, the synchronizing signal has a data format consisting of a 1-bit passive state (the state in which no signal is present on the bus MB) and a 1-bit dominant state (the state in which a signal is present on the bus MB). The synchronizing signal is inserted every fifth bit of data so that the individual nodes may be synchronized for receiving the message.

The ANC Field is an acknowledgment signal field for all of the nodes connected to the network. As shown in FIG. 2C, the ANC Field has its time slots allocated to the respective nodes on the network. Specifically, the nodes 10A, 10B, and 20A to 20D are respectively assigned unique physical addresses (e.g., physical addresses "1", "2", . . . ), and the time slots are allocated to the respective physical addresses. Each of the nodes transmits a 1-bit ACK signal (e.g., ACK1, ACK2, . . . ) to the time slot corresponding to its physical address.

Thus, when a message is properly received, each of the basic and I/O nodes transmits a 1-bit ACK signal to the bus MB, at the time slot position allocated thereto in the ANC Field of the same message. Consequently, the source or transmitting-side node can determine based on the ACK signal responses which nodes have properly received the message transmitted therefrom, in other words, whether or not any of the nodes failed to properly receive the message.

FIGS. 2D and 2E illustrate the data formats of the SOF and EOF, respectively. The SOF has a unique 8-bit data format that never appears in the other fields of the frame, whereas the EOF has a 2-bit data format. Thus, each node can immediately recognize the start of a frame upon detecting the pattern uniquely assigned to the SOF. In this embodiment, the communication control circuit of each of the basic and I/O nodes is constructed such that, when a frame is received from the bus, the communication control circuit recovers from a transmission inhibited state upon detecting the unique bit pattern (SOF) of the frame, thereby ensuring recovery from the transmission inhibited state.

Figure 6:
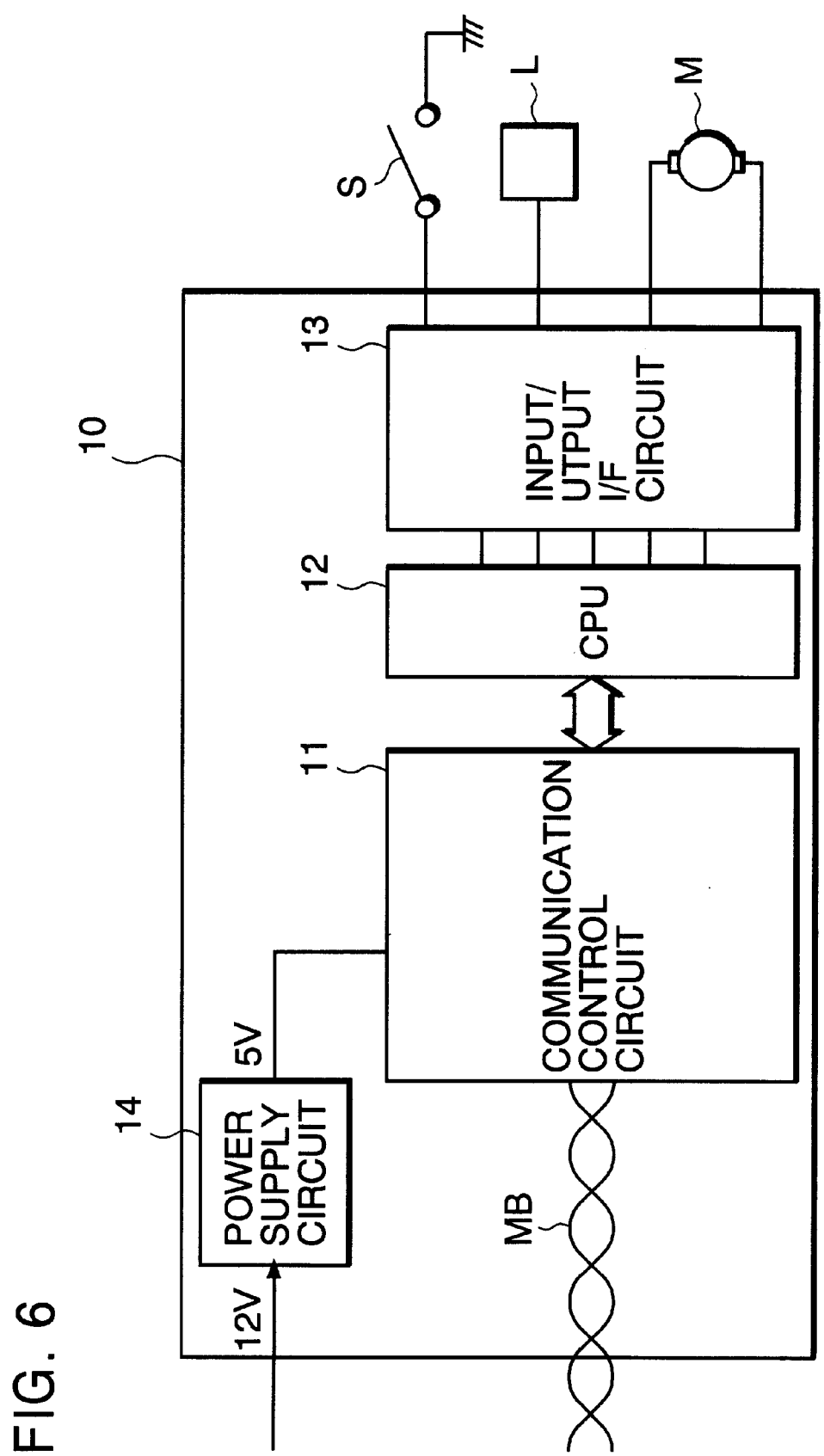
FIG. 6 is a block diagram showing, by way of example, the arrangement of a basic node including a CPU.

The basic nodes 10A and 10B each have an arrangement similar to that of the node 10 shown in FIG. 6. Specifically, the basic nodes 10A and 10B include communication control circuits 11A and 11B, and CPUs 12A and 12B, respectively, and are connected to various loads such as switches, lamps, etc. Each basic node may be constituted by a one-chip communication control IC incorporating the communication control circuit and the CPU, for example.

In the basic nodes 10A and 10B, the communication control circuits 11A and 11B each receive a frame transmitted via the bus MB, and the CPUs 12A and 12B each detect the value of the ID in the received frame to determine whether or not a reception process should be carried out. When data to be transmitted is generated in the basic node, the CPU 12A, 12B writes a transmission frame in the communication control circuit 11A, 11B, which then transmits the frame upon detecting an unoccupied state of the bus MB.

Figure 7:
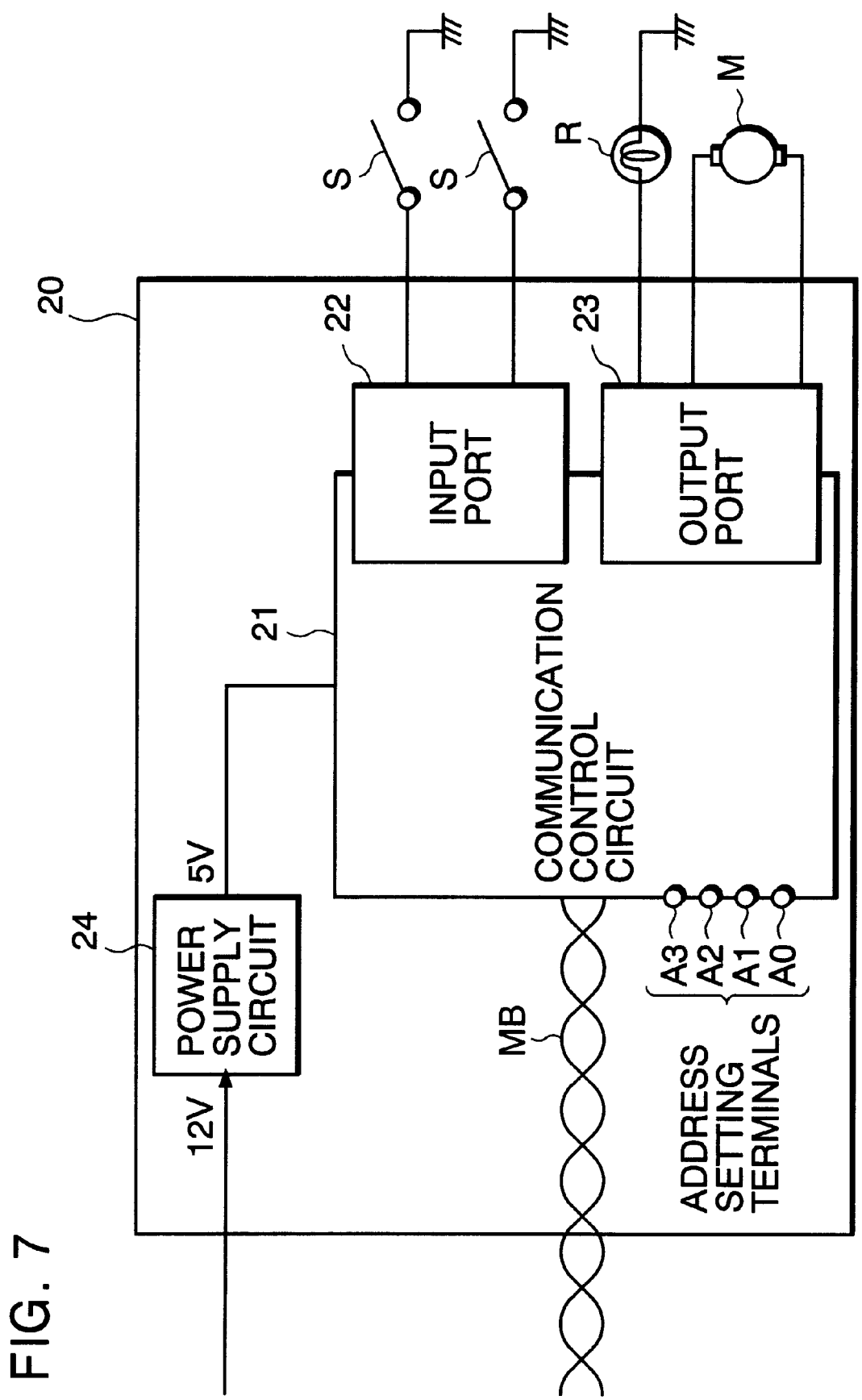
FIG. 7 is a block diagram showing, by way of example, the arrangement of an I/O node including no CPU.

The I/O nodes 20A to 20D each have an arrangement similar to that of the node 20 shown in FIG. 7. Specifically, these I/O nodes 20A to 20D include communication control circuits 21A to 21D, respectively, and are connected to various loads etc. The communication control circuits 11A, 11B and 21A to 21D respectively have their own unique physical addresses set by means of address setting terminals.

In each of the I/O nodes 20A to 20D, when any one of switches S is turned on or off, the corresponding input value of the input port connected to the switch changes. On detecting the change, the corresponding one of the communication control circuits 21A to 21D transmits the values of the input port to the bus MB in the form of a frame format shown in FIG. 3A. The ID shown in FIG. 3A includes the physical address of the communication control circuit of the source or transmitting-side node, whereby the source node can be identified. Also, the bits in the Data Field correspond to respective bits of the input port. Accordingly, the values in the Data Field represent current values of the input port of the source node, as shown in FIG. 3B.

When a node has received a frame destined therefor as shown in FIG. 3C, its communication control circuit supplies the data in this frame to the output port. The ID in the frame shown in FIG. 3C includes the physical address of the communication control circuit of the destination or receiving-side node, whereby each communication control circuit can determine whether the frame is destined therefor or not. Also, the bits of the Data Field in the frame correspond to the respective bits of the output port, as shown in FIG. 3D; therefore, the communication control circuit supplies the values in the Data Field to its output port when it is judged that the frame is destined therefor.

The operation of the multiplex transmission system according to this embodiment will be now described. First, how the communication control circuit of each node operates at the time of transmitting a frame will be explained.

Each of the communication control circuits monitors the bus MB at all times to determine whether the bus MB is in an idle or non-idle state. When a frame transmission request has been generated and if the bus MB being monitored is in the idle state, the source or transmitting-side communication control circuit immediately starts to transmit a frame from the first bit of the SOF. If a frame exists on the bus MB and accordingly the bus MB is in the non-idle state, the source communication control circuit starts the frame transmission after the bus MB becomes idle.

Each communication control circuit is set in a non-idle state when it is reset or is supplied with a sleep command. On the other hand, upon receiving the EOF of a frame or when the passive state is detected for more than a predetermined time period, each communication control circuit is set in an idle state.

The following describes how each of the communication control circuits operates when the bus MB has developed fault, for example, when the bus MB is short-circuited to the ground.

When an input value of the input port of any one of the communication control circuits 21A to 21D of the I/O nodes 20A to 20D has changed, the corresponding communication control circuit starts to transmit a frame as soon as a transmission request flag is set in the circuit therein. Namely, this communication control circuit sends the first bit of the SOF. trying to set the bus MB in the dominant state. Since the bus MB is short-circuited to the ground, however, the bus MB remains in the passive state. Accordingly, the communication control circuit can detect the abnormality upon receiving the first bit of the SOF. The transmitting-side communication control circuit suspends the frame transmission, then sets a transmission inhibit flag, and enters the transmission inhibited state. The transmission inhibited state is canceled when a bit pattern coinciding with the SOF pattern is received from the bus MB, or when the communication control circuit is set in a sleep state or is reset.

When the communication control circuit 21A, 21B, 21C or 21D enters the transmission inhibited state, a flag indicative of non-idle state of the bus MB is also set therein. Consequently, even if the transmission inhibited state is canceled while another node is transmitting a frame (see FIG. 3A) onto the bus MB, the communication control circuit does not immediately initiate the frame transmission, but starts to transmit the frame after detecting the idle state of the bus MB. In this embodiment, therefore, it is possible to prevent a situation where frames being transmitted from the other nodes are destroyed.

The communication control circuits 11A and 11B of the basic nodes 10A and 10B also operate in the same manner as the communication control circuits 21A to 21D of the I/O nodes. Besides, each of the communication control circuits 11A and 11B has a control register therein, which register includes a bit for canceling the transmission inhibited state from the CPU side. Also when this bit is set by the CPU, the communication control circuit recovers from the transmission inhibited state.

In the following is described how differently the network operates depending on which part of the bus has developed fault.

In the case where a fault has occurred in the bus MB shown in FIG. 1, the communication control circuit of the I/O node 20A, 20B, 20C or 20D starts to transmit a frame as soon as the transmission request flag is set in the circuit therein, but enters the transmission inhibited state upon detecting the abnormality of the bus MB.

Similarly, the communication control circuit of the basic node 10A or 10B initiates frame transmission as soon as the transmission request flag of the control register in its circuit is set by the CPU 12A or 12B, but upon detecting the abnormality of the bus MB, it sets the transmission inhibit flag in the control register and enters the transmission inhibited state.

The CPUs 12A and 12B each have a timer function. The CPU starts the timer upon detecting the setting of the transmission inhibit flag, and clears the transmission inhibit flag and thereby cancels the transmission inhibited state upon lapse of a predetermined time period. After the transmission inhibited state is canceled, the communication control circuit 11A, 11B again starts to transmit the frame. If the fault in the bus MB is not yet mended, the basic node again enters the transmission inhibited state and then cancels the same upon lapse of the predetermined time period to retry the frame transmission. Thus, in this embodiment, the transmission inhibited state is canceled at predetermined intervals of time by the timer in each basic node, so that the frame transmission is tried repeatedly. Accordingly, even if the basic node is once set in the transmission inhibited state, it can recover for itself to the operative state immediately after the fault is mended.

When the fault has been mended, the communication control circuit 11A, 11B transmits the frame to the end. According to this embodiment, therefore, the communication control circuits of the nodes other than the source basic node can recover from their transmission inhibited state on detecting the SOF (see FIG. 2D) of the transmitted frame, and after the reception of the frame is completed, the other nodes are allowed to transmit a frame therefrom. In this embodiment, the transmission inhibited state can be canceled with accuracy because it is canceled when the unique bit pattern (SOF) of a frame is detected.

On the other hand, in the case where a fault has occurred in the branch MB3 shown in FIG. 1, for example, the basic nodes 10A and 10B and the I/O nodes 20B to 20D can satisfactorily perform data communications. However, when the communication control circuit 21A of the I/O node 20A starts to transmit a frame as soon as the transmission request flag is set in the circuit therein, it enters the transmission inhibited state on detecting the abnormality.

The basic node 10A, 10B periodically transmits a frame in order to cancel the transmission inhibited state of the communication control circuit 21A, as in the case where a fault has occurred in the bus MB. While the branch MB3 remains faulty, the I/O node 20A is unable to receive the frame periodically transmitted from the basic node 10A, 10B, and thus its transmission inhibited state continues.

When the fault in the branch MB3 has been mended, the I/O node 20A can receive the unique pattern of the SOF in the frame transmitted from the basic node 10A, 10B, whereby the transmission inhibited state of the communication control circuit 21A is canceled. After the reception of this frame is completed, the communication control circuit 21A can start its frame transmission.

Thus, in this embodiment, when the fault in a branch has been mended, the node connected to the branch can be restored to the network in a short period of time as soon as it receives a frame periodically transmitted thereto.

The following is a description of the operation during the sleep state.

During normal operation, the basic nodes 10A and 10B shown in FIG. 1 monitor the network status as well as the values of input data. If the objects being monitored remain unchanged for more than a predetermined time period, the basic node 10A, 10B sends a sleep command to cause each of the I/O nodes 20A to 20D to enter a sleep state, and at the same time enters the sleep state itself.

The sleep state mentioned herein denotes a state in which the node ceases operation with its oscillation stopped or the oscillation frequency decreased. In the case where the system of this embodiment is applied to a control system for electrical equipment of an automobile, the nodes enter the sleep state when the engine is at rest, for example, to thereby reduce the power consumption and prevent the battery from going dead.

While in the sleep state, each node monitors the status of its input port. If the position of a switch S connected to the I/O node 20A, for example, shifts and thus the input port status of the communication control circuit 21A changes, the I/O node 20A starts operation (or wakes up) by initiating the oscillation or raising the oscillation frequency, and sends a frame indicative of its input port status to the bus MB. The other nodes also wake up due to the transmission of this frame, and the whole network starts operation.

If, in such a situation, the bus MB develops fault, the basic node 10A, 10B enters the transmission inhibited state on detecting the abnormality. In this case, if the input data remains unchanged for more than the predetermined time period, the basic node 10A, 10B alone enters the sleep state, since it is unable to transmit a sleep command by means of a frame. Simultaneously with this, the basic node 10A, 10B clears the transmission inhibit flag and thus recovers from the transmission inhibited state.

Upon change of a value of the input port, the communication control circuit 11A, 11B wakes up and starts to transmit data of its input port values in the form of the frame shown in FIG. 3A. In this case, if the fault has been mended, the communication control circuit 11A, 11B continues the frame transmission, and if the fault is not yet mended, the control circuit 11A, 11B again enters the transmission inhibited state. Automobiles to which this invention is applied are often used in such a manner that the time for which the engine remains at rest is longer than the time for which the engine is operated, and the repair or replacement of the faulty bus MB is usually performed with the engine stopped. Accordingly, there is a high probability that the fault is mended while the nodes are in the sleep state. By canceling the transmission inhibited state during the sleep state, as in this embodiment, it is possible to promptly detect the elimination of the fault during the sleep state and thereby restore the network immediately to the normal state. Also, in this embodiment, the other nodes wake up on receiving a frame, so that the entire network can start operation.

In this embodiment, the transmission inhibit flag is cleared at the time of entry to the sleep state, but the present invention is not limited to this. For example, the transmission inhibit flag may be cleared at the time of wake-up, and also in this case advantages similar to those described above can be achieved.

When the bus MB has developed fault, the I/O nodes 20A to 20D also enter the transmission inhibited state on detecting the abnormality. Each of the I/O nodes 20A to 20D is constructed such that the node enters the sleep state if its input port status remains unchanged for more than a predetermined time period while in the transmission inhibited state. Accordingly, even in the event that an I/O node is incapable of receiving a sleep command from the basic node, it can enter the sleep state. In the case where the system of this embodiment is used as the control system for electrical equipment of an automobile, therefore, it is possible to prevent the battery from going dead.

The communication control circuit of each I/O node wakes up as soon as a value of its input port changes, and starts to transmit the input port data in the form of the frame shown in FIG. 3A. If the fault has been mended, the communication control circuit continues the frame transmission, and if the fault still exists, the communication control circuit again enters the transmission inhibited state. Also in this case, the other nodes wake up in response to the frame transmission and can start to operate as network components.

In the case where the branch MB3, for example, has developed fault, the I/O node 20A alone enters the transmission inhibited state, whereas the other nodes operate normally. If the status of the input port remains unchanged for more than the predetermined time period, the I/O node 20A enters the sleep state, as mentioned above. Thus, even when an I/O node is unable to receive a sleep command from the basic node, it can enter the sleep state. Accordingly, where the system of this embodiment is applied to the control system for electrical equipment of an automobile, the battery can be prevented from going dead.

The communication control circuit of each I/O node wakes up as soon as a value of its input port changes, and starts to transmit the input port data in the form of the frame shown in FIG. 3A. If the fault has been mended, the communication control circuit continues the frame transmission, and if the fault is still present, the communication control circuit again enters the transmission inhibited state. Also, when the fault is mended and a frame transmitted from another node is received, the I/O node wakes up and is restored to the network. Therefore, in this embodiment, the network can be promptly restored to its normal state.

According to another embodiment of this invention, the communication control circuit of each I/O node includes a timer therein. In this embodiment, operation of the timer may be started when the communication control circuit enters the transmission inhibited state, and the transmission inhibit flag may be cleared upon lapse of a predetermined time period to thereby cancel the transmission inhibited state, so that the frame transmission may be retried. In this case, if the fault is not yet mended, the I/O node enters the transmission inhibited state by again setting the transmission inhibit flag, and repeats the above operation.

Thus, according to this embodiment, the timer is started simultaneously with the entry to the transmission inhibited state, and the transmission inhibited state is canceled and the frame transmission is retried at predetermined intervals of time; therefore, the I/O node itself can cancel its transmission inhibited state. The I/O node can therefore be promptly restored after the fault is mended.

Further, the communication control circuit of each I/O node may be provided with a sleep setting terminal connected to the basic node via an electric wire. In this case, the status of the sleep setting terminal can be changed by the basic node to cause the I/O node to enter the sleep state or to wake up. Since it is not necessary for the I/O node to receive a sleep command from the basic node, the I/O node can enter the sleep state even when the bus has developed fault.

According to these embodiments, an I/O node, which is used exclusively for the input/output of data, can be promptly restored to the network after a fault in the bus branch connected to this I/O node is mended, whereby the influence of the bus fault is minimized.

Each of the I/O nodes with no CPU, mentioned above with reference to the foregoing embodiments, transmits and receives a frame in which an identifier uniquely assigned thereto is inserted, and on receiving the frame, it compares the identifier inserted in the received frame with the identifier assigned thereto. In this regard, each I/O node may be constructed such that it performs a frame reception process when the incoming frame includes an identifier different from that in the frame transmitted therefrom.

The communication control circuit used in this case includes a reception register 11a, an ID comparing circuit 11b and a reception processing circuit 11c, as shown in FIG.

4, for example. The communication control circuit once stores the signal (frame) received from the bus MB in the reception register 11a, which then outputs the values of the individual bits of the ID in the signal to the ID comparing circuit 11b. The ID comparing circuit 11b compares the value represented by the input ID bits with the physical address value assigned to this communication control circuit. If the input ID value differs from the ID value inserted in a frame to be transmitted from this communication control circuit, the ID comparing circuit 11b outputs a reception process-enabling signal to the reception processing circuit 11c to permit the circuit 11c to process the received signal. The ID in a transmission frame is set under the following conditions.

As shown in FIG. 2B, the ID in a frame consists of 8-bit data and synchronizing bits, and the bit "0" of the ID is set to logical "0" for a transmission frame and to logical "1" for a reception frame. The bits "4" to "1" of the ID represent the physical address value of a corresponding one of the nodes. The bits "7" to "5" of the ID are all set to logical "1" so as to indicate that this frame is a transmission/reception frame of an I/O node which has no CPU. Namely, the ID data is made up of the bit "0" indicating the frame type, the bits "4" to "1" indicating the physical address of a node, and the bits "7" to "5" indicating the node type.

Figure 5:
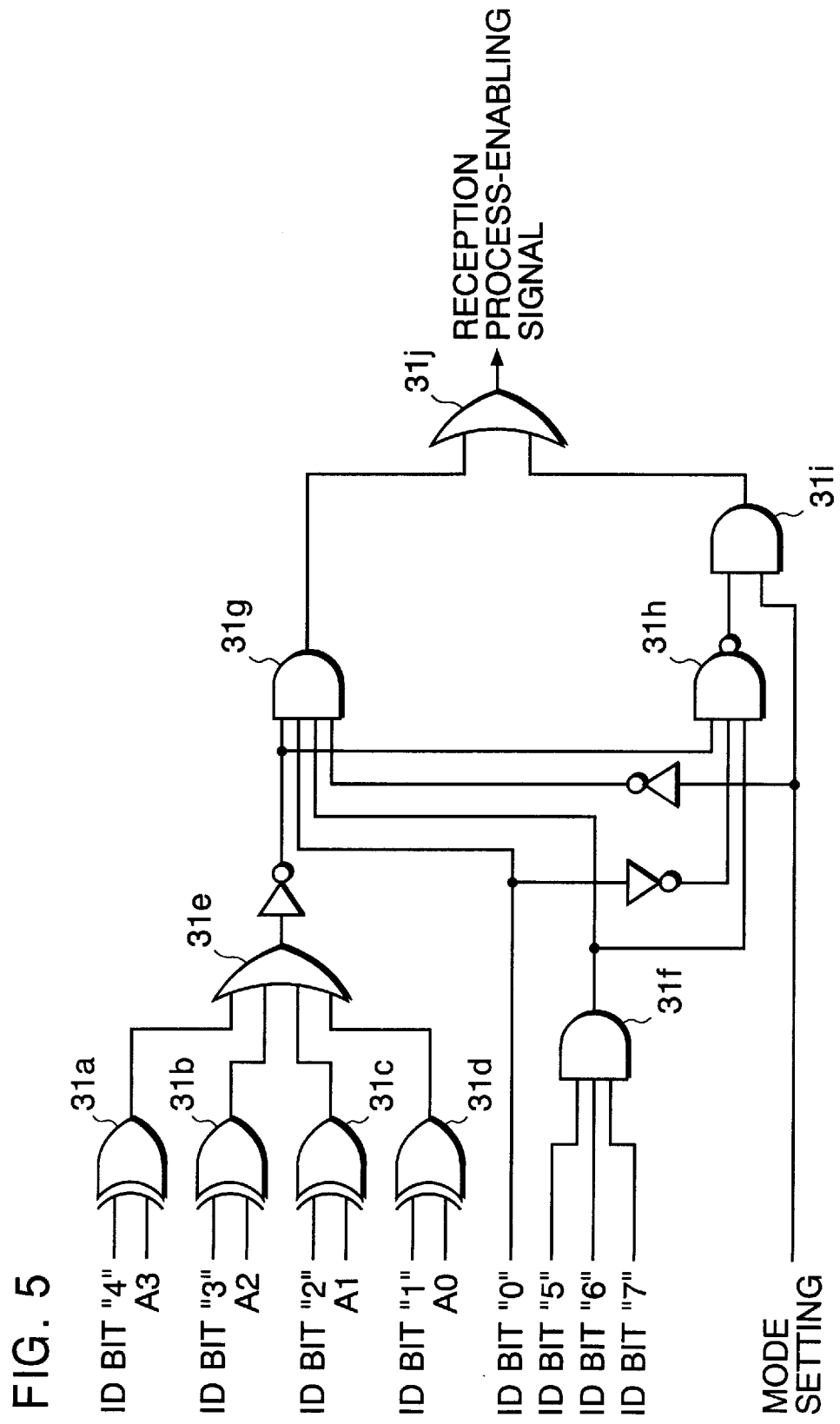
FIG. 5 is a circuit diagram showing the arrangement of an ID comparing circuit appearing in FIG. 4.

The ID comparing circuit 11b has a circuit arrangement shown in FIG. 5. In the ID comparing circuit 11b, exclusive-OR (XOR) circuits 31a to 31d and an OR circuit 31e serve to compare the ID of its transmission frame, for example, the value set by means of physical address setting terminals A3 to A0 (see FIG. 7), with the value represented by the ID bits "4" to "1" stored in the reception register 31. This ID comparing circuit 11b sets a reception processing mode for all of the frames having IDs other than the ID whose bits "4" to "1" are found to be identical with the transmission ID bits as a result of the above comparison, whose bits "7" to "5" are found to be all logical "1" as a result of the comparison by means of an AND circuit 31f, and whose bit "0" is logical "0" indicative of the transmission frame.

Then, the outputs of the OR circuit 31e and the AND circuit 31f, the value of the ID bit "0" and the mode setting value are subjected to comparison by means of an AND circuit 31g, a NOT-AND (NAND) circuit 31h and an AND circuit 31i. When the output from at least one of the AND circuits 31g and 31i is logical "1", the ID comparing circuit 11b outputs the reception process-enabling signal to the reception processing circuit 33 from an OR circuit 31j.

Namely, in this embodiment, an additional terminal is provided for the mode setting, and when the value input from this terminal is "1", the reception process-enabling signal is output to the reception processing circuit, whereby the aforementioned reception processing mode is set. Consequently, the reception processing circuit 33 can process the received signal when supplied with the reception process-enabling signal.

Thus, according to this embodiment, each node performs the reception process for all frames except for those transmitted therefrom, so that frames transmitted after the elimination of a fault can be received by all nodes except the source node. Therefore, not only the node designated by the ID but also the other nodes can promptly cancel their transmission inhibited state and thus can be restored to the network. This embodiment is also advantageous in that it permits the transmission/reception of frames not only between the basic and I/O nodes but also between the I/O nodes.

The multiplex transmission method of this invention is not limited to the combinations described in the foregoing embodiments, but a variety of other combinations may be employed.

What is claimed is:

1. A multiplex transmission system for transmitting and receiving a message having a frame format, said system comprising:

first and second multiplex transmission apparatuses interconnected via a multiplex transmission line, the first and second multiplex transmission apparatuses each having a communication control circuit;

wherein each of the communication control circuits includes means for making the multiplex transmission line active when transmitting a frame therefrom, and for, on judging that the multiplex transmission line is not active when receiving the frame, suspending transmission of the frame and entering a transmission inhibited state, wherein the first multiplex transmission apparatus includes means for periodically transmitting frames therefrom, and wherein the second multiplex transmission apparatus includes means for cancelling the transmission inhibited state thereof in response to received frames.

2. A multiplex transmission system for transmitting and receiving a message having a frame format, said system comprising:

a plurality of multiplex transmission apparatuses interconnected via a multiplex transmission line, each of the multiplex transmission apparatuses including at least a communication control circuit;

wherein each of the communication control circuits includes means for making the multiplex transmission line active when transmitting a frame therefrom, and for, on judging that the multiplex transmission line is not active when receiving the frame, suspending transmission of the frame and entering a transmission inhibited state, wherein each of the multiplex transmission apparatuses further includes a timer, and means for starting the timer thereof upon entry to the transmission inhibited state, and for periodically cancelling the transmission inhibited state to try transmission of the frame.

3. The multiplex transmission system according to claim 1, wherein the multiplex transmission line includes branches to which the multiplex transmission apparatuses are respectively connected.

4. The multiplex transmission system according to claim 1, wherein each of the multiplex transmission apparatuses further comprises:

means for transmitting and receiving a frame in which an identifier previously assigned thereto is inserted, means for comparing the identifier inserted in the frame with an identifier previously assigned thereto when the frame is received, and means for processing the received frame if the identifier inserted in the received frame differs from the identifier of the frame transmitted therefrom.

5. The multiplex transmission system according to claim 2, wherein each of the multiplex transmission apparatuses further comprises:

means for transmitting and receiving a frame in which an identifier previously assigned thereto is inserted, means for comparing the identifier inserted in the frame with an identifier previously assigned thereto when the frame is received, and means for processing the received frame if the identifier inserted in the received frame differs from the identifier of the frame transmitted therefrom.

6. The multiplex transmission system according to claim 1, wherein each of the multiplex transmission apparatuses includes means for being set in a non-idle state while the communication control circuit thereof is in the transmission inhibited state, and for starting to transmit a frame therefrom on detecting an idle state after the transmission inhibited state is canceled.

7. The multiplex transmission system according to claim 2, wherein each of the multiplex transmission apparatuses includes means for being set in a non-idle state while the communication control circuit thereof is in the transmission inhibited state, and for starting to transmit a frame therefrom on detecting an idle state after the transmission inhibited state is canceled.

8. The multiplex transmission system according to claim 4, wherein each of the multiplex transmission apparatuses includes means for being set in a non-idle state while the communication control circuit thereof is in the transmission inhibited state, and for starting to transmit a frame therefrom on detecting an idle state after the transmission inhibited state is canceled.

9. The multiplex transmission system according to claim 5, wherein each of the multiplex transmission apparatuses includes means for being set in a non-idle state while the communication control circuit thereof is in the transmission inhibited state, and for starting to transmit a frame therefrom on detecting an idle state after the transmission inhibited state is canceled.

10. The multiplex transmission system according to claim 1, wherein each of the multiplex transmission apparatuses includes means for cancelling the transmission inhibited state thereof upon detecting a unique bit pattern of a frame when the communication control circuit thereof receives the frame from the multiplex transmission line.

11. The multiplex transmission system according to claim 2, wherein each of the multiplex transmission apparatuses includes means for cancelling the transmission inhibited state thereof upon detecting a unique bit pattern of a frame when the communication control circuit thereof receives the frame from the multiplex transmission line.

12. The multiplex transmission system according to claim 4, wherein each of the multiplex transmission apparatuses includes means for cancelling the transmission inhibited state thereof upon detecting a unique bit pattern of a frame when the communication control circuit thereof receives the frame from the multiplex transmission line.

13. The multiplex transmission system according to claim 5, wherein each of the multiplex transmission apparatuses includes means for cancelling the transmission inhibited state thereof upon detecting a unique bit pattern of a frame when the communication control circuit thereof receives the frame from the multiplex transmission line.

14. The multiplex transmission system according to claim 6, wherein each of the multiplex transmission apparatuses includes means for cancelling the transmission inhibited state thereof upon detecting a unique bit pattern of a frame when the communication control circuit thereof receives the frame from the multiplex transmission line.

15. The multiplex transmission system according to claim 7, wherein each of the multiplex transmission apparatuses includes means for cancelling the transmission inhibited state thereof upon detecting a unique bit pattern of a frame when the communication control circuit thereof receives the frame from the multiplex transmission line.

16. The multiplex transmission system according to claim 8, wherein each of the multiplex transmission apparatuses includes means for cancelling the transmission inhibited state thereof upon detecting a unique bit pattern of a frame when the communication control circuit thereof receives the frame from the multiplex transmission line.

17. The multiplex transmission system according to claim 9, wherein each of the multiplex transmission apparatuses includes means for cancelling the transmission inhibited state thereof upon detecting a unique bit pattern of a frame when the communication control circuit thereof receives the frame from the multiplex transmission line.

18. The multiplex transmission system according to claim 1, wherein each of the multiplex transmission apparatuses includes means for cancelling the transmission inhibited state thereof while in a sleep state.

19. The multiplex transmission system according to claim 2, wherein each of the multiplex transmission apparatuses includes means for cancelling the transmission inhibited state thereof while in a sleep state.

20. The multiplex transmission system according to claim 4, wherein each of the multiplex transmission apparatuses includes means for cancelling the transmission inhibited state thereof while in a sleep state.

21. The multiplex transmission system according to claim 5, wherein each of the multiplex transmission apparatuses includes means for cancelling the transmission inhibited state thereof while in a sleep state.

22. The multiplex transmission system according to claim 6, wherein each of the multiplex transmission apparatuses includes means for cancelling the transmission inhibited state thereof while in a sleep state.

23. The multiplex transmission system according to claim 7, wherein each of the multiplex transmission apparatuses includes means for cancelling the transmission inhibited state thereof while in a sleep state.

24. The multiplex transmission system according to claim 8, wherein each of the multiplex transmission apparatuses includes means for cancelling the transmission inhibited state thereof while in a sleep state.

25. The multiplex transmission system according to claim 9, wherein each of the multiplex transmission apparatuses includes means for cancelling the transmission inhibited state thereof while in a sleep state.

26. The multiplex transmission system according to claim 10, wherein each of the multiplex transmission apparatuses includes means for cancelling the transmission inhibited state thereof while in a sleep state.

27. The multiplex transmission system according to claim 11, wherein each of the multiplex transmission apparatuses includes means for cancelling the transmission inhibited state thereof while in a sleep state.

28. The multiplex transmission system according to claim 12, wherein each of the multiplex transmission apparatuses includes means for cancelling the transmission inhibited state thereof while in a sleep state.

29. The multiplex transmission system according to claim 13, wherein each of the multiplex transmission apparatuses includes means for cancelling the transmission inhibited state thereof while in a sleep state.

30. The multiplex transmission system according to claim 14, wherein each of the multiplex transmission apparatuses includes means for cancelling the transmission inhibited state thereof while in a sleep state.

31. The multiplex transmission system according to claim 15, wherein each of the multiplex transmission apparatuses includes means for cancelling the transmission inhibited state thereof while in a sleep state.

32. The multiplex transmission system according to claim 16, wherein each of the multiplex transmission apparatuses includes means for cancelling the transmission inhibited state thereof while in a sleep state.

33. The multiplex transmission system according to claim 17, wherein each of the multiplex transmission apparatuses includes means for cancelling the transmission inhibited state thereof while in a sleep state.

34. The multiplex transmission system according to claim 2, wherein the multiplex transmission line includes branches to which the multiplex transmission apparatuses are respectively connected.

* * * * *

UNITED STATES PATENT AND TRADEMARK OFFICE
CERTIFICATE OF CORRECTION

PATENT NO. : 5,940,366
DATED : August 17, 1999
INVENTOR(S) : Moriue et al

It is certified that error appears in the above-identified patent and that said Letters Patent is hereby corrected as shown below:

Title page,
Insert --Item [30] Foreign Application Priority Data Japan 8-9638 1/23/96

Signed and Sealed this

Twenty-first Day of August, 2001

Attest:

NICHOLAS P. GODICI
Attesting Officer    Acting Director of the United States Patent and Trademark Office